United States Patent
Yamada et al.

[11] Patent Number: 5,835,288
[45] Date of Patent: Nov. 10, 1998

[54] IMAGING LENS

[75] Inventors: Hiroshi Yamada; Akiko Nagahara, both of Omiya, Japan

[73] Assignee: Fuji Photo Optical Co., Ltd., Omiya, Japan

[21] Appl. No.: 842,270

[22] Filed: Apr. 24, 1997

[30] Foreign Application Priority Data

May 13, 1996 [JP] Japan ................................. 8-143755

[51] Int. Cl.$^6$ ................................................. G02B 9/04
[52] U.S. Cl. ........................................ 359/793; 359/717
[58] Field of Search .................................. 359/793, 794, 359/796, 646, 651, 691, 784, 791, 792, 790, 717

[56] References Cited

U.S. PATENT DOCUMENTS

| | | | |
|---|---|---|---|
| 2,889,745 | 6/1959 | Hayes et al. | 359/793 |
| 3,912,379 | 10/1975 | DeJager | 359/790 |
| 4,542,961 | 9/1985 | Sato | 359/790 |
| 5,327,291 | 7/1994 | Baker et al. | 359/793 |
| 5,521,761 | 5/1996 | Morooka | 359/784 |
| 5,615,051 | 3/1997 | Takato | 359/790 |
| 5,617,255 | 4/1997 | Yamada | 359/784 |

FOREIGN PATENT DOCUMENTS 7-168092  7/1995  Japan.

*Primary Examiner*—Hung X. Dang
*Assistant Examiner*—Dawn-Marie Bey
*Attorney, Agent, or Firm*—Ronald R. Snider

[57] ABSTRACT

In a configuration constituted by two lens sheets, the ranges of levels of refractive index n and Abbe number v of the image-side lens made of a biconvex lens are specified in order to realize an imaging lens constituted by two lens sheets which can attain a long back focus, a relatively wide angle of view, a high brightness, a small size, and a lower manufacturing cost. The imaging lens comprises, successively disposed from the object side to the image side, a concave lens and a biconvex lens, while at least one surface of the concave lens is an aspheric surface. Also, assuming that the refractive index and Abbe number of the biconvex lens are respectively n and v, the following conditional expressions (1) and (2):

$$1.55 \leq n \quad (1)$$

$$35 \leq v \quad (2)$$

are satisfied.

6 Claims, 11 Drawing Sheets

← OBJECT SIDE

← OBJECT SIDE

FIG. 4
ON AXIS 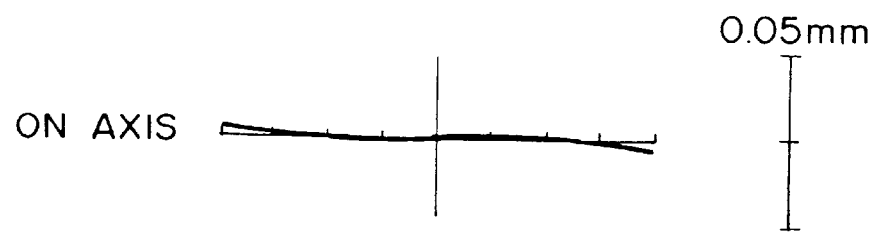
0.05mm
$\omega = 11.9°$ 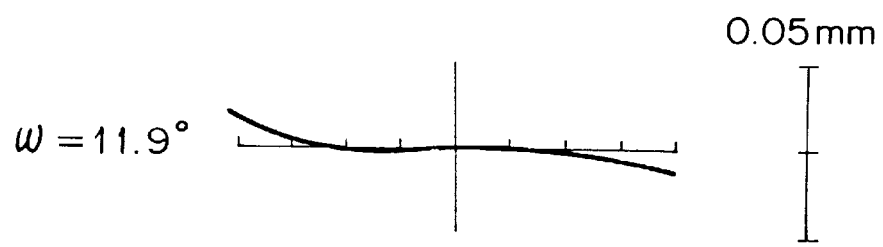
0.05mm
$\omega = 18.1°$ 
0.05mm
$\omega = 24.7°$ 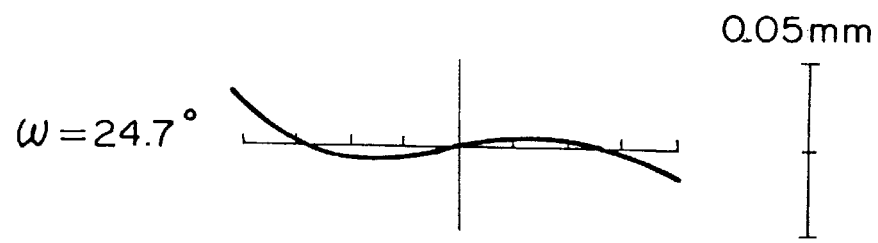
0.05mm
$\omega = 32.2°$ 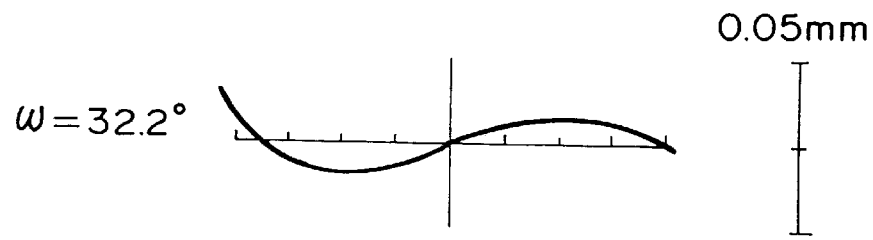
0.05mm

FIG. 6
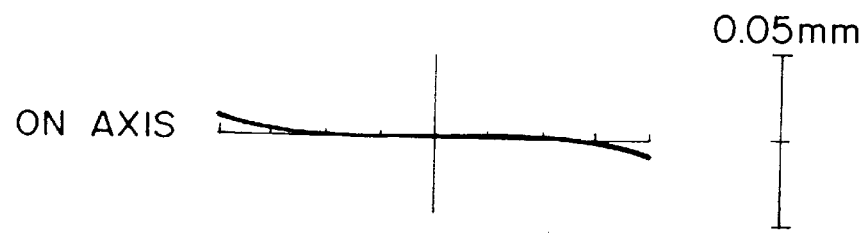
ON AXIS — 0.05mm
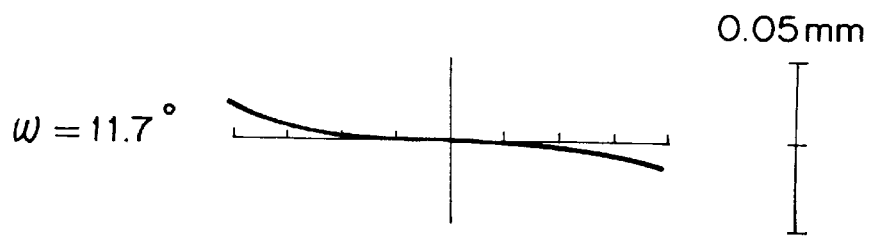
ω = 11.7° — 0.05mm
ω = 17.8° — 0.05mm
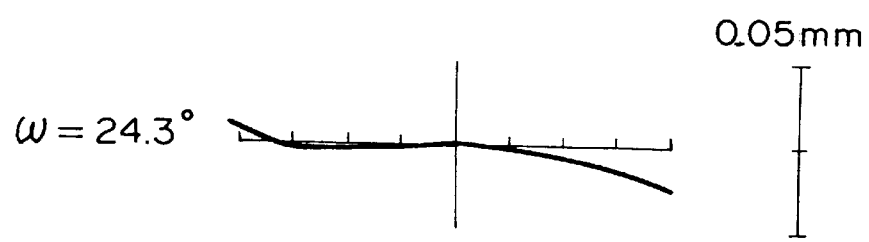
ω = 24.3° — 0.05mm
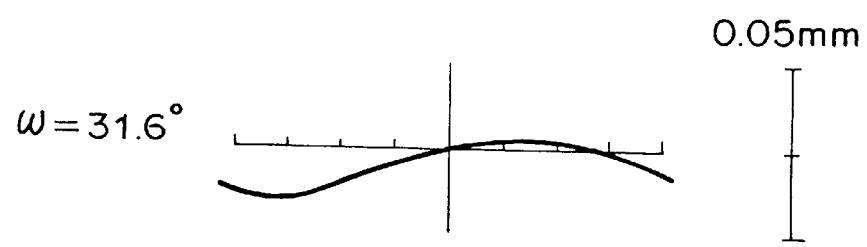
ω = 31.6° — 0.05mm

FIG.8
ON AXIS 
$\omega = 11.7°$ 
$\omega = 17.7°$ 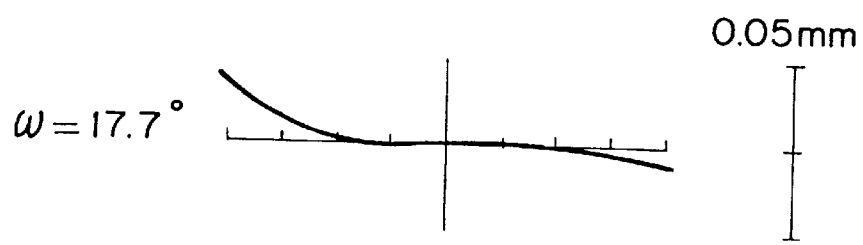
$\omega = 24.1°$ 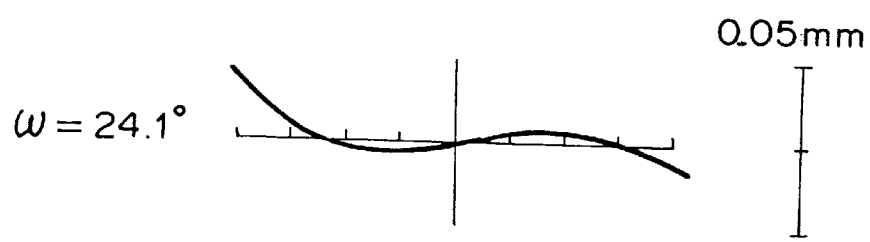
$\omega = 31.0°$ 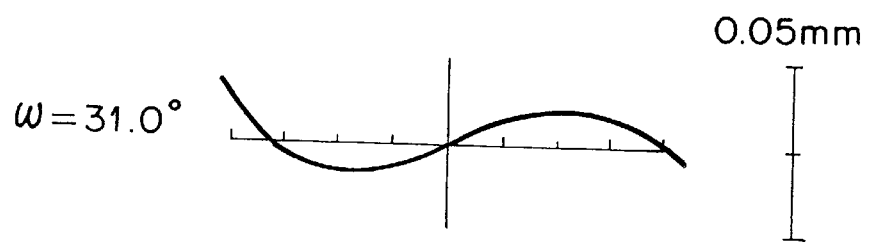

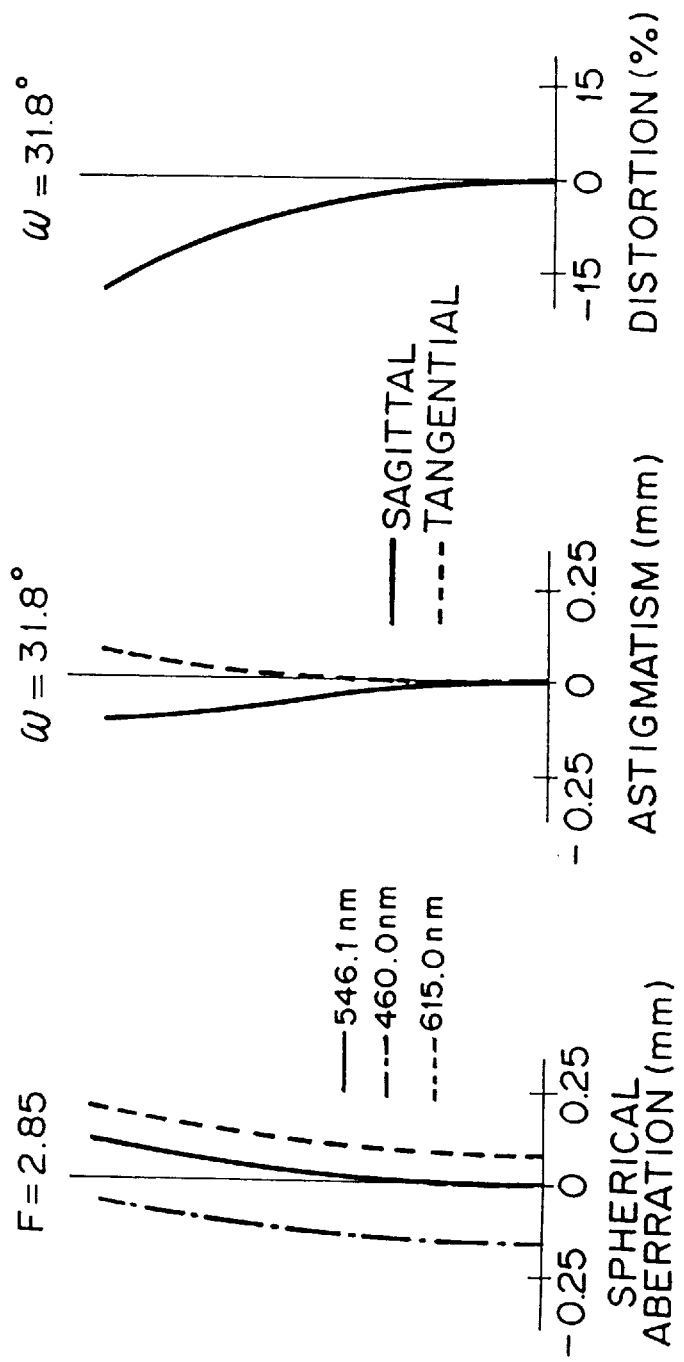
F I G. 9

FIG. 12
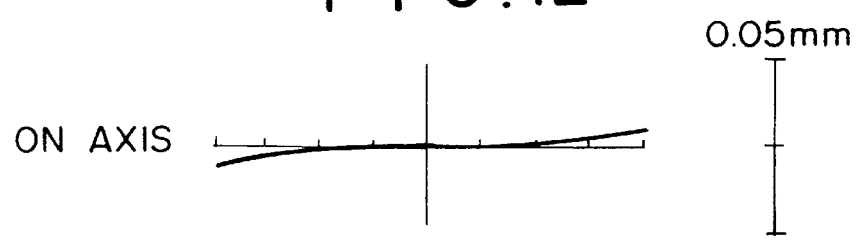
ON AXIS    0.05mm
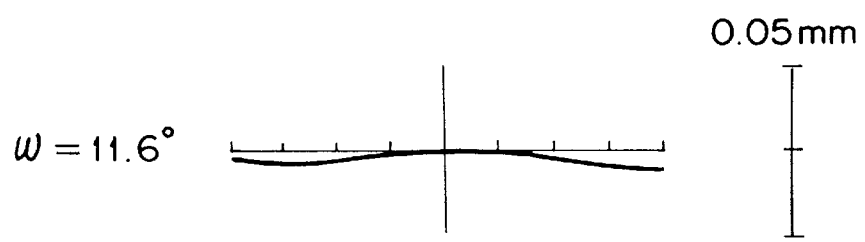
ω = 11.6°    0.05mm
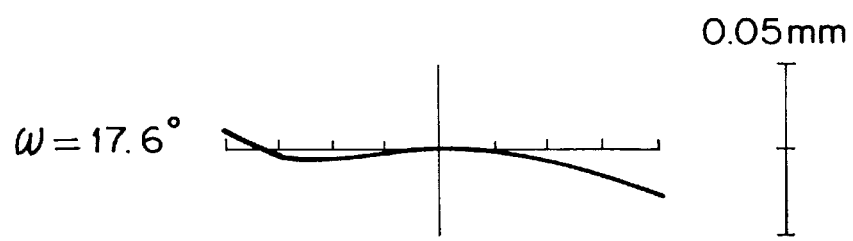
ω = 17.6°    0.05mm
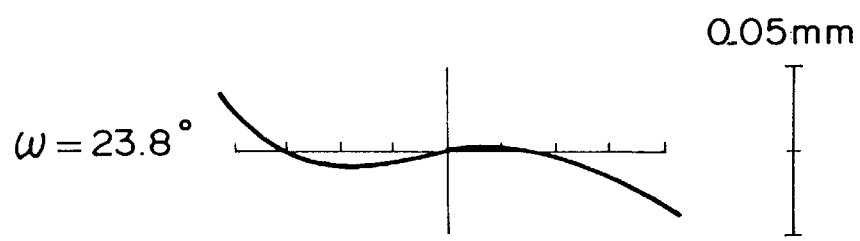
ω = 23.8°    0.05mm
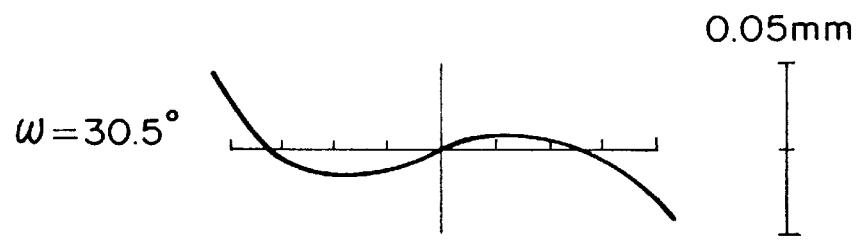
ω = 30.5°    0.05mm

IMAGING LENS

RELATED APPLICATIONS

This application claims the priority of Japanese Patent Application No. 8-143755 filed on May 13, 1996, which is incorporated herein by reference.

BACKGROUND OF THE INVENTION

1. Field of the Invention

The present invention relates to an imaging lens composed of two lens sheets and, in particular, to an imaging lens suitable as a camera lens for video camera, still video camera, and the like used for TV phone, door phone, monitor, and the like.

2. Description of the Prior Art

Recently, solid- state imaging devices have often been disposed on imaging surfaces of various kinds of video cameras and still video cameras. The solid- state imaging devices have been reducing their sizes year by year as their technology advances. Accordingly, imaging lenses have been required to attain a smaller size, a wider angle of view, and a lower cost.

In the above- mentioned various kinds of video cameras and still video cameras, on the other hand, between their camera lens and solid- state imaging device, a low- pass filter for preventing moire, an infrared cutoff filter for correcting the spectral sensitivity of the solid- state imaging device, a cover glass for protecting the imaging surface, or the like is often disposed. In this case, in order to secure a space for these elements, it is necessary for the camera lens to have a considerably long back focus.

The applicant has already proposed an imaging lens composed of two lens sheets made of glass (Japanese Unexamined Patent Publication No. 7-168092). Since this imaging lens does not use a plastic lens, the molding die used for forming the plastic lens is unnecessary, whereby the manufacturing cost can be reduced.

When a larger number of lenses are to be produced, however, it is advantageous for the lenses to be molded by a die from the viewpoint of reducing the manufacturing cost.

SUMMARY OF THE INVENTION

In view of the foregoing circumstances, it is an object of the present invention to provide an imaging lens composed of two lens sheets, which can yield a relatively long back focus and a relatively wide angle of view, while the manufacturing cost thereof can be reduced even in the case of mass production.

The imaging lens of the present invention comprises, successively disposed from the object side to the image side, a concave lens and a biconvex lens, wherein at least one surface of the concave lens is an aspheric surface, and wherein, assuming that the refractive index and Abbe number of the biconvex lens are respectively n and v, the following conditional expressions (1) and (2):

$$1.55 \leq n \tag{1}$$

$$35 \leq v \tag{2}$$

are satisfied.

In this imaging lens, it is preferred that, assuming that the radius of curvature of the object-side surface of the concave lens is $R_1$, the focal length of the whole lens system is f, and the thickness of the concave lens on the optical axis is $d_1$, the following conditional expressions (3) and (4):

$$0.7 < |R_1|/f < 2.0 \tag{3}$$

$$0.3 < d_1/f < 1.6 \tag{4}$$

be satisfied.

Further, in the imaging lens, it is preferred that the concave lens be made of plastic.

BRIEF DESCRIPTION OF THE DRAWINGS

FIG. 4 is an aberration chart (showing coma) of the lens in accordance with Embodiment 1;

FIG. 6 is an aberration chart (showing coma) of the lens in accordance with Embodiment 2;

FIG. 8 is an aberration chart (showing coma) of the lens in accordance with Embodiment 3;

FIG. 9 is an aberration chart (showing spherical aberration, astigmatism, and distortion) of the lens in accordance with Embodiment 4;

FIG. 12 is an aberration chart (showing coma) of the lens in accordance with Embodiment 5.

DETAILED DESCRIPTION OF THE PREFERRED EMBODIMENTS

In the following, embodiments of the present invention will be explained with reference to the attached drawings.

Figure 1:
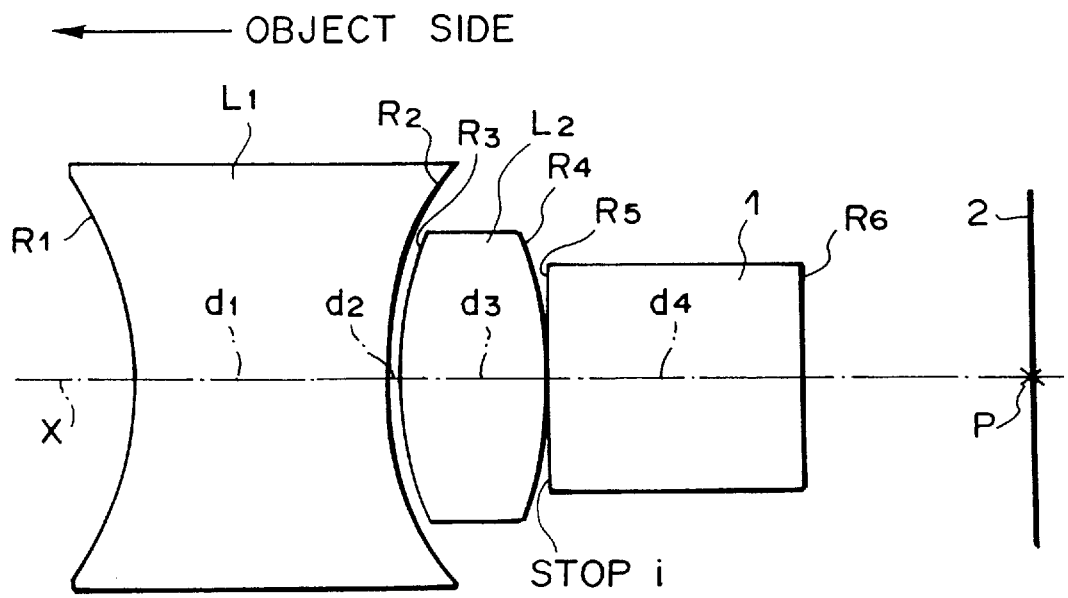
Fig. 1 is a schematic view showing a basic lens configuration in accordance with Embodiments 1, 3, 4, and 5 of the present invention.
Figure 2:
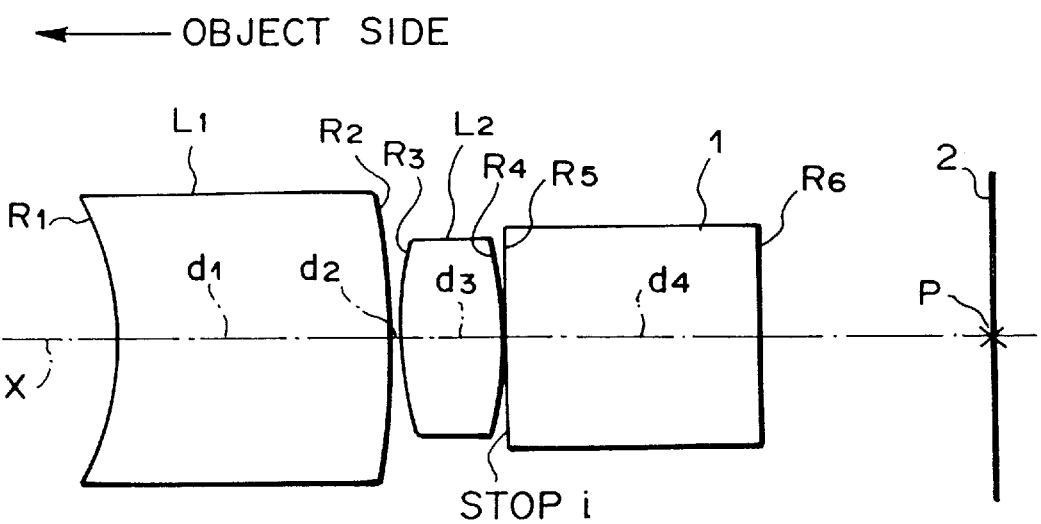
FIG. 2 is a schematic view showing a basic lens configuration in accordance with Embodiment 2 of the present invention.
Figure 3:
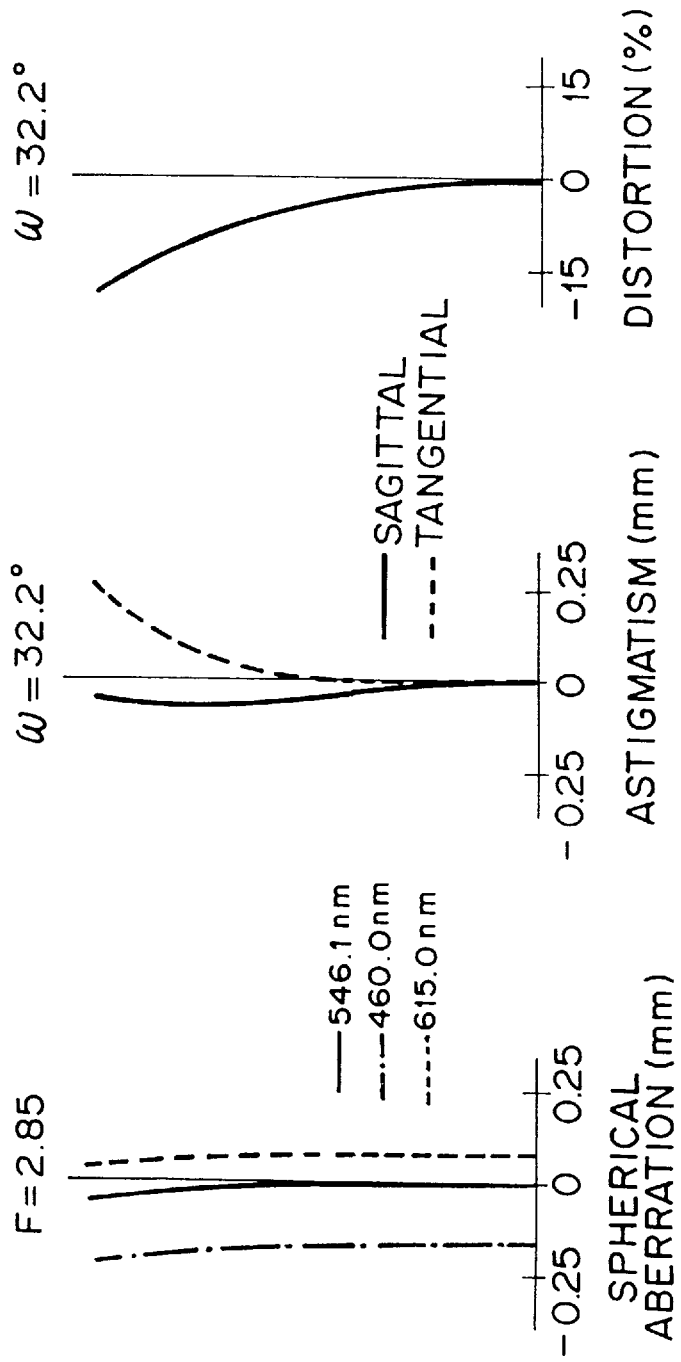
FIG. 3 is an aberration chart (showing spherical aberration, astigmatism, and distortion) of the lens in accordance with Embodiment 1.
Figure 5:
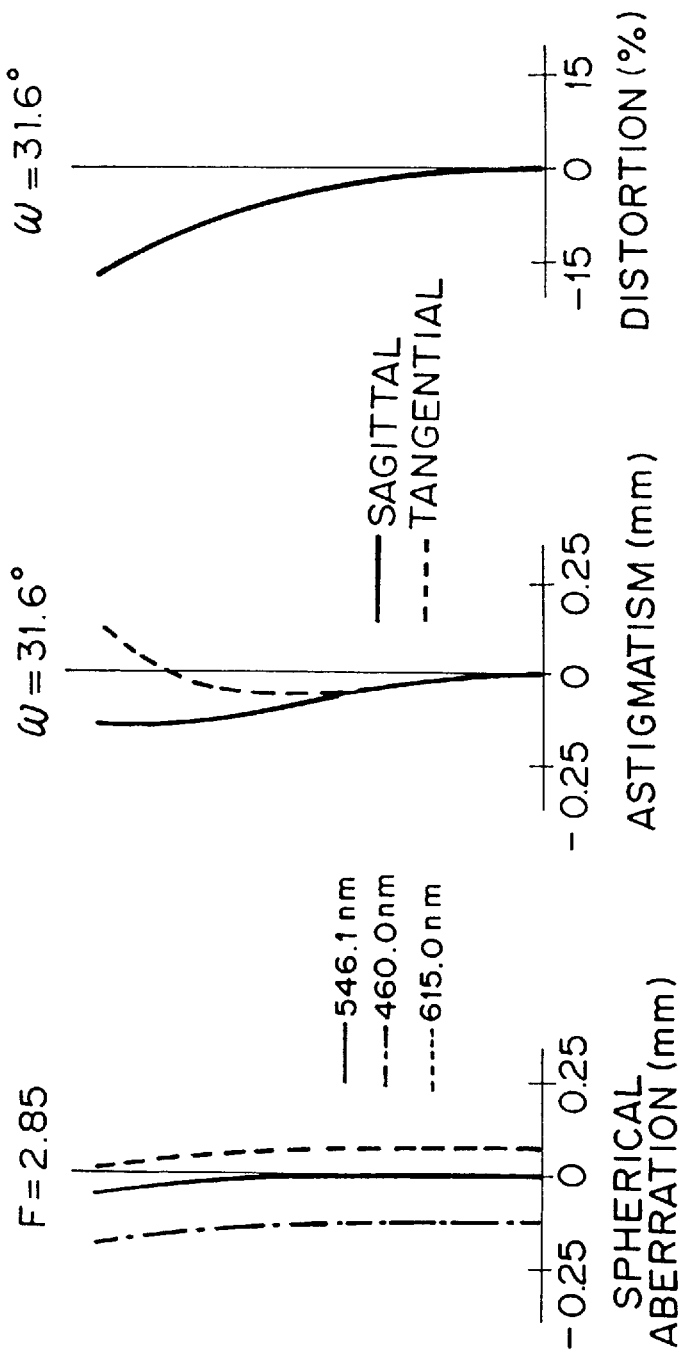
FIG. 5 is an aberration chart (showing spherical aberration, astigmatism, and distortion) of the lens in accordance with Embodiment 2.
Figure 7:
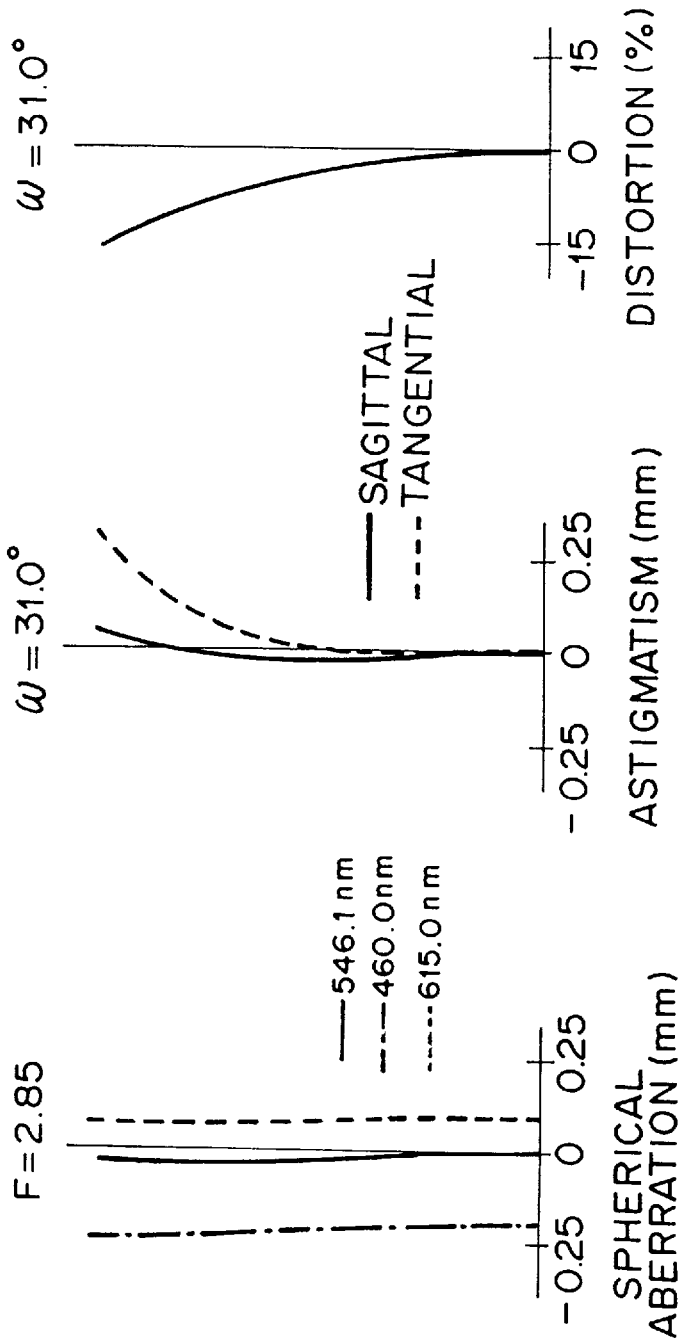
FIG. 7 is an aberration chart (showing spherical aberration, astigmatism, and distortion) of the lens in accordance with Embodiment 3.
Figure 10:
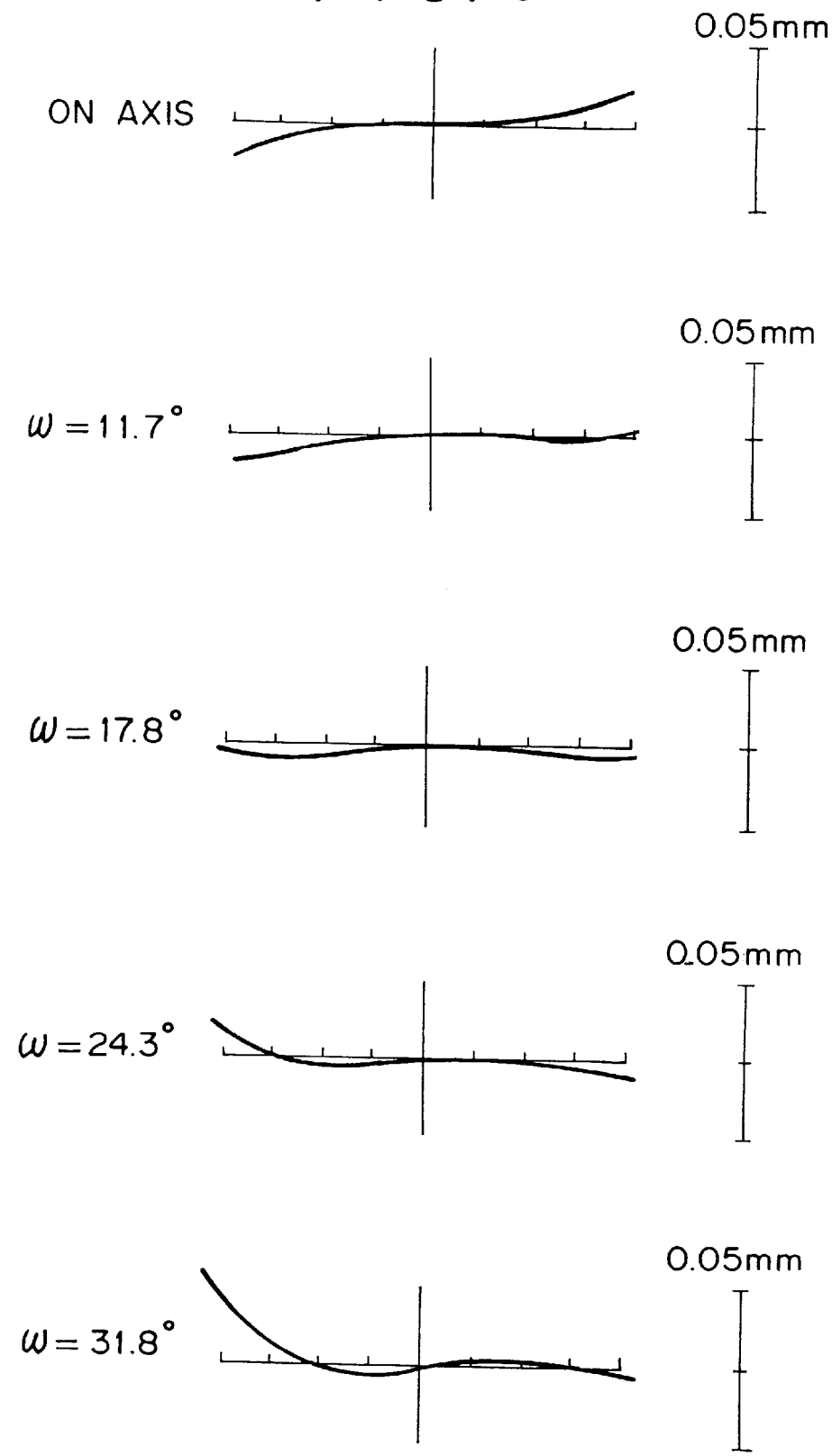
FIG. 10 is an aberration chart (showing coma) of the lens in accordance with Embodiment4.
Figure 11:
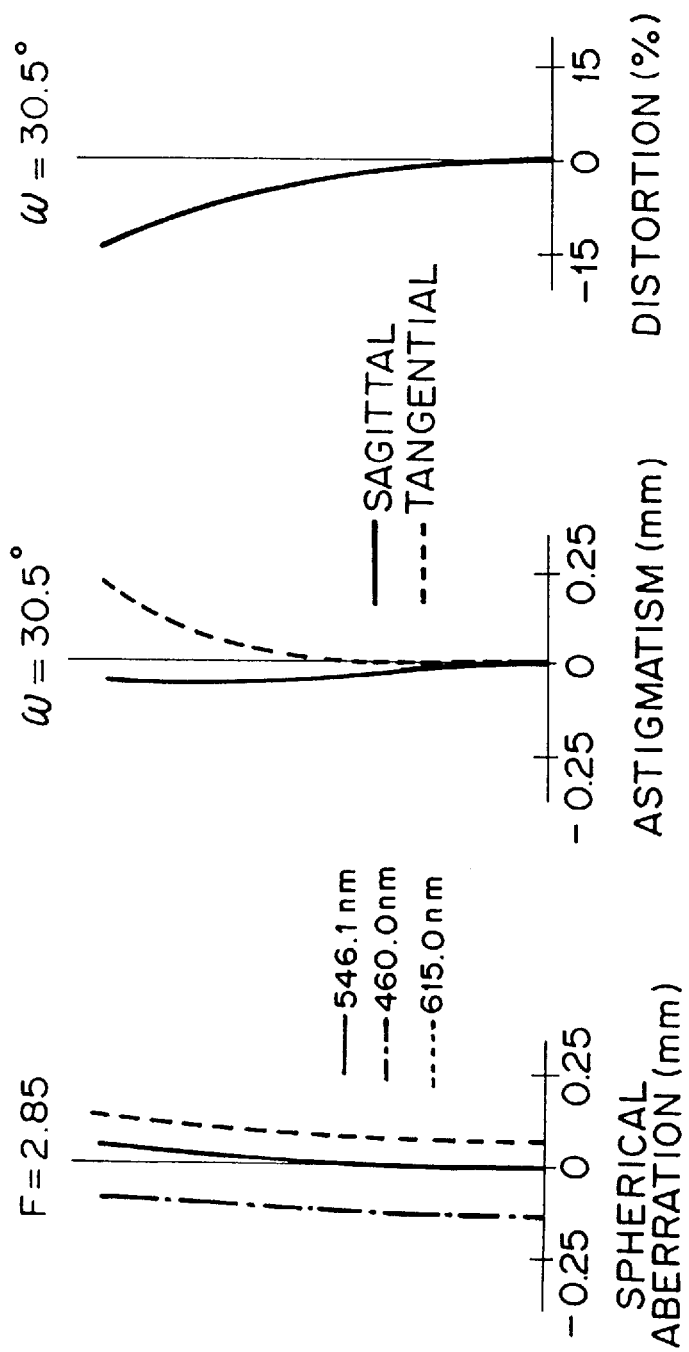
FIG. 11 is an aberration chart (showing spherical aberration, astigmatism, and distortion) of the lens in accordance with Embodiment 5.

Here, FIG. 1 shows a basic lens configuration in Embodiments 1, 3, 4,and5,whereas FIG. 2 shows that in Embodiment 2. As shown in FIGS. 1 and 2, the imaging lens in accordance with these embodiments is constituted by two sheets of lenses $L_1$ and $L_2$, while a stop i is disposed between the second lens $L_2$ and a low-pass filter 1 (or on the object-side surface of the low-pass filter 1). A luminous flux incident on the imaging lens along its optical axis X from the object side forms an image at an imaging position P of a solid- state imaging device 2.

Here, the first lens $L_1$ is a lens which has a negative power and at least one aspheric surface (a biconcave lens whose object- side surface is an aspheric surface in Embodiments 1, 3, 4, and 5 or a meniscus lens whose both surfaces are aspheric in Embodiment 2), whereas the second lens $L_2$ is a biconvex lens whose both surfaces have substantially the same curvature.

Also, these lenses satisfy the following conditional expressions (1) to (4):

$$1.55 \leq n \quad (1)$$

$$35 \leq v \quad (2)$$

$$0.7 < |R_1|/f < 2.0 \quad (3)$$

$$0.3 < d_1/f < 1.6 \quad (4)$$

wherein n is the refractive index of the second lens $L_2$;

v is the Abbe number of the second lens $L_2$;

$R_1$ is the radius of curvature of the object-side surface of the first lens $L_1$;

$d_1$ is the thickness of the first lens $L_1$ on the optical axis; and f is the focal length of the whole lens system.

According to the lens configuration of these embodiments, as shown in FIGS. 1 and 2, a retro-focus type arrangement is established, whereby a long back focus can be attained, and a relatively wide angle of view represented by a half field angle ω of about 32 degrees can be obtained as well. Also, when at least one surface of the concave lens, which is the first lens $L_1$, is made aspherical, spherical aberration, coma, and distortion can be kept at favorable levels.

The above conditional expressions (1) and (2) define the ranges of levels of the refractive index n and Abbe number v of the second lens $L_2$ made of a biconvex lens. Of these expressions, (1) relates to coma and astigmatism. Since the lenses in accordance with these embodiments satisfy this conditional expression (1), they can advantageously correct coma and astigmatism, thereby yielding performances sufficient for imaging lenses. Conditional expression (2) relates to chromatic aberration. Since the lenses in accordance with these embodiments satisfy this conditional expression (2), they can advantageously correct chromatic aberration, thereby yielding performances sufficient for imaging lenses.

Beyond the upper limits of the above conditional expressions (3) and (4), the lens thickness of the first lens $L_1$ becomes so large that the productivity may deteriorate. Also, the lens diameter becomes so large that a smaller size may be hard to obtain. Further, coma and spherical aberration may lose a favorable balance therebetween. Below the lower limits of conditional expressions (3) and (4), by contrast, the curvature of the image-side surface of the first lens $L_1$ becomes so large that productivity may deteriorate. Also, below the lower limit of conditional expression (4), a long back focus may not be attained.

Further, when a plastic lens is employed as the concave lens constituting the first lens $L_1$, the lens system can have a lighter weight since the first lens $L_1$ accounts for a large percentage of the whole lens system in terms of weight.

In the following, Embodiments 1 to 5 will be explained with reference to specific values.

(Embodiment 1)

The following Table 1 lists radius of curvature R (mm) of each lens surface, center thickness of each lens and air gap between neighboring lenses d (mm), and refractive index n and Abbe number v of each lens at e-line in Embodiment 1.

Here, in Table 1 as well as Tables 2 to 5 which will be explained later, the numbers referring to each of R, d, n, and v successively increase from the object side. Each of the surfaces denoted by "*" refers to an aspheric surface which is represented by the following aspheric surface expression:

(aspheric surface expression)

$$Z = CY^2/(1 = (1-KC^2Y^2)^{1/2}) + a_4Y^4 + a_6Y^6 + a_8Y^8 + a_{10}Y^{10}$$

C: Curvature at the apex of aspheric surface

K: Cone constant a: Aspheric surface constant

Y: Height from the optical axis

Z: Distance from the tangent plane at the lens apex to a point on the aspheric surface In this embodiment, focal length f, back focus $B_F$, $F_{NO}$, and half field angle ω of the whole lens system are 6.19 mm, 7.54 mm, 2.85, and 32.2 degrees, respectively.

(Embodiment 2)

The following Table 2 lists radius of curvature R (mm) of each lens surface, center thickness of each lens and air gap between neighboring lenses d (mm), and refractive index n and Abbe number v of each lens at e-line in Embodiment 2.

In this embodiment, the focal length f, back focus $B_F$, $F_{NO}$, and half field angle (o of the whole lens system are 6.30 mm, 7.65 mm, 2.85, and 31.6 degrees, respectively.

(Embodiment 3)

The following Table 3 lists the radius of curvature R (mm) of each lens surface, center thickness of each lens and air gap between neighboring lenses d (mm), and refractive index n and Abbe number v of each lens at e-line in Embodiment 3.

In this embodiment, the focal length f, back focus $B_F$, $F_{NO}$, and half field angle ω of the whole lens system are 6.30 mm, 7.91 mm, 2.85, and 31.0 degrees, respectively.

(Embodiment 4)

The following Table 4 lists the radius of curvature R (mm) of each lens surface, center thickness of each lens and air gap between neighboring lenses d (mm), and refractive index n and Abbe number v of each lens at e-line in Embodiment 4.

In this embodiment, the focal length f, back focus $B_F$, $F_{NO}$, and half field angle ω of the whole lens system are 6.31 mm, 7.63 mm, 2.85, and 31.8 degrees, respectively.

(Embodiment 5)

The following Table 5 lists the radius of curvature R (mm) of each lens surface, center thickness of each lens and air gap between neighboring lenses d (mm), and refractive index n and Abbe number v of each lens at e-line in Embodiment 5.

In this embodiment, the focal length f, back focus $B_F$, $F_{NO}$, and half field angle ω of the whole lens system are 6.30 mm, 7.48 mm, 2.85, and 30.5 degrees, respectively.

FIGS. 3, 5, 7, 9, and 11 respectively show aberrations (spherical aberration, astigmatism, and distortion) of Embodiments 1 to 5, whereas FIGS. 4, 6, 8, 10, and 12 respectively show comas of Embodiments 1 to 5. In these aberration charts, c indicates the half field angle. As can be seen from FIGS. 3 to 12, these embodiments can keep the aberrations at favorable levels.

Here, between the imaging lens and the light-receiving surface of the solid-state imaging device, an infrared cutoff filter or cover glass may be inserted in place of or together with the low-pass filter.

As explained in the foregoing, in accordance with the imaging lens of the present invention, since it is configured as a retro-focus type lens constituted by two lens sheets which are respectively concave and convex satisfying predetermined conditional expressions, while having a simple two-sheet configuration, it can yield a long back focus, an $F_{NO}$ as bright as about 2.8, and a relatively wide half field angle of about 32 degrees. Also, it has a small size and can be mass-produced at a low cost. This imaging lens is suitable as a camera lens for various video cameras and still video cameras.

TABLE 1

| Surface | R | d | n | ν |
|---|---|---|---|---|
| 1 | −6.857 | 4.9 | 1.49217 | 57.3 |
| *2 | 13.898 | 0.2 | | |
| 3 | 7.248 | 2.9 | 1.81081 | 40.5 |
| 4 | −7.248 | 0.0 | | |
| 5 | ∞ | 4.9 | 1.51825 | 63.8 |
| 6 | ∞ | | | |

Aspheric surface data

| Surface | C | K | $a_4$ | $a_6$ | $a_8$ | $a_{10}$ |
|---|---|---|---|---|---|---|
| 2 | 1/13.898 | 1.0 | $2.96116 \times 10^{-3}$ | $8.02546 \times 10^{-8}$ | $-2.85987 \times 10^{-11}$ | $-4.77173 \times 10^{-14}$ | f = 6.19 mm    $B_F$ = 7.54 mm    $F_{NO}$ = 2.85
ω = 32.2°    $|R_1|/f$ = 1.1    $d_1/f$ = 0.8

TABLE 2

| Surface | R | d | n | ν |
|---|---|---|---|---|
| *1 | −5.917 | 5.2 | 1.49217 | 57.3 |
| *2 | −12.663 | 0.2 | | |
| 3 | 7.318 | 2.0 | 1.55156 | 45.2 |
| 4 | −7.149 | 0.0 | | |
| 5 | ∞ | 4.9 | 1.51825 | 63.8 |
| 6 | ∞ | | | |

Aspheric surface data

| Surface | C | K | $a_4$ | $a_6$ | $a_8$ | $a_{10}$ |
|---|---|---|---|---|---|---|
| 1 | −1/5.917 | 1.0 | $5.39038 \times 10^{-5}$ | $1.48489 \times 10^{-7}$ | $4.86042 \times 10^{-13}$ | $-8.10574 \times 10^{-15}$ |
| 2 | −1/12.663 | 1.0 | $1.67657 \times 10^{-3}$ | $-1.65772 \times 10^{-8}$ | $-3.15901 \times 10^{-12}$ | $-4.33388 \times 10^{-15}$ | f = 6.30 mm    $B_F$ = 7.65 mm    $F_{NO}$ = 2.85
ω = 31.6°    $|R_1|/f$ = 0.9    $d_1/f$ = 0.8

TABLE 3

| Surface | R | d | n | ν |
|---|---|---|---|---|
| 1 | −4.800 | 2.6 | 1.49217 | 57.3 |
| *2 | 5.473 | 0.2 | | |
| 3 | 5.988 | 2.4 | 1.88812 | 40.7 |
| 4 | −5.988 | 0.0 | | |
| 5 | ∞ | 4.9 | 1.51825 | 63.8 |
| 6 | ∞ | | | |

Aspheric surface data

| Surface | C | K | $a_4$ | $a_6$ | $a_8$ | $a_{10}$ |
|---|---|---|---|---|---|---|
| 2 | 1/5.473 | 1.0 | $3.94874 \times 10^{-3}$ | $-5.03343 \times 10^{-6}$ | $-8.22924 \times 10^{-9}$ | $-1.31689 \times 10^{-11}$ | f = 6.30 mm    $B_F$ = 7.91 mm    $F_{NO}$ = 2.85
ω = 31.0°    $|R_1|/f$ = 0.8    $d_1/f$ = 0.4

TABLE 4

| Surface | R | d | n | ν |
|---|---|---|---|---|
| 1 | −12.000 | 9.7 | 1.49217 | 57.3 |
| *2 | 10.501 | 0.2 | | |
| 3 | 7.816 | 4.2 | 1.81081 | 40.5 |
| 4 | −7.816 | 0.0 | | |
| 5 | ∞ | 4.9 | 1.51825 | 63.8 |
| 6 | ∞ | | | |

TABLE 4-continued

Aspheric surface data

| Surface | C | K | $a_4$ | $a_6$ | $a_8$ | $a_{10}$ |
|---|---|---|---|---|---|---|
| 2 | 1/10.501 | 1.0 | $2.67116 \times 10^{-3}$ | $7.57255 \times 10^{-8}$ | $-4.07468 \times 10^{-11}$ | $-6.72987 \times 10^{-14}$ |

| | | |
|---|---|---|
| f = 6.31 mm | $B_F$ = 7.63 mm | $F_{NO}$ = 2.85 |
| ω = 31.8° | $|R_1|/f$ = 1.9 | $d_1/f$ = 1.5 |

TABLE 5

| Surface | R | d | n | ν |
|---|---|---|---|---|
| 1 | −5.612 | 2.5 | 1.49217 | 57.3 |
| *2 | 7.129 | 0.2 | | |
| 3 | 5.863 | 2.5 | 1.81081 | 40.5 |
| 4 | −5.863 | 0.0 | | |
| 5 | ∞ | 4.9 | 1.51825 | 63.8 |
| 6 | ∞ | | | |

Aspheric surface data

| Surface | C | K | $a_4$ | $a_6$ | $a_8$ | $a_{10}$ |
|---|---|---|---|---|---|---|
| 2 | 1/7.129 | 1.0 | $5.31606 \times 10^{-3}$ | $9.79749 \times 10^{-8}$ | $-3.93023 \times 10^{-11}$ | $-6.51686 \times 10^{-14}$ |

| | | |
|---|---|---|
| f = 6.30 mm | $B_F$ = 7.48 mm | $F_{NO}$ = 2.85 |
| ω = 30.5° | $|R_1|/f$ = 0.9 | $d_1/f$ = 0.4 |

What is claimed is:

1. An imaging lens consisting of first and second lenses, successively disposed from an object side to an image side, the first lens having a concave surface disposed towards said object side, wherein the second lens is a biconvex lens, wherein at least one surface of said first lens is an aspheric surface, and wherein, when refractive index and Abbe number of said second biconvex lens are respectively n and ν, the following conditional expressions (1) and (2):

$$1.55 \leq n \quad (1)$$

$$35 \leq \nu \quad (2)$$

are satisfied.

2. An imaging lens according to claim 1, wherein, assuming that radius of curvature of the object-side surface of said first lens is $R_1$, focal length of the whole lens system is $f_1$, and thickness of said first lens on an optical axis is $d_1$, the following conditional expressions (3) and (4):

$$0.7 < |/R_1|/f < 2.0 \quad (3)$$

$$0.3 < d_1/f < 1.6 \quad (4)$$

be satisfied.

3. An imaging lens according to claim 1, wherein said first lens is made of plastic.

4. An Imaging lens according to claim 1 wherein said first lens having a concave surface is a negative lens.

5. An imaging device according to claim 1 further comprising a stop positioned behind said second biconvex lens.

6. An imaging lens according to claim 1 wherein said aspheric surface is located at a greater distance Y from an optical axis.

* * * * *